(12) United States Patent
Koenig et al.

(10) Patent No.: US 6,381,086 B1
(45) Date of Patent: Apr. 30, 2002

(54) PROGRAMMABLE ACTIVE DAMPING FOR HIGH-SPEED WRITE DRIVER

(75) Inventors: Reed H. Koenig, Wyomissing; Craig B. Ziemer, Fleetwood, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/607,337

(22) Filed: Oct. 23, 2000

(51) Int. Cl.[7] .................................................. G11B 5/02
(52) U.S. Cl. ...................................................... 360/68
(58) Field of Search ............................. 360/68, 67, 46, 360/61; 377/551, 108, 110, 309, 310, 494, 478, 530, 424, 423, 362

(56) References Cited

U.S. PATENT DOCUMENTS 6,246,269 B1 * 6/2001 Schuler et al. ................. 360/68
6,246,533 B1 * 6/2001 Davis et al. .................... 360/68

* cited by examiner

Primary Examiner—Alan T. Faber

(57) ABSTRACT

Programmable active damping of the overshoot in the bipolar write driver output current waveform in the write head of a hard disk drive is provided by subtracting, a controlled amount of current from the writer current, for a predetermined duration, at the beginning of each transition of the write driver output current.

20 Claims, 3 Drawing Sheets

PROGRAMMABLE ACTIVE DAMPING FOR HIGH-SPEED WRITE DRIVER

BACKGROUND OF THE INVENTION

1. Field of the Invention

This invention relates generally to magnetic type digital storage apparatus and more particularly to circuitry for actively damping overshoot in the writer output current waveform of a hard disk drive read/write head controller integrated circuit.

2. Description of Related Art

Conventional hard disk drives currently being manufactured typically utilize an analog integrated circuit (IC) chip known as a read/write head controller, also referred to as a "preamp". The purpose of the preamp is to provide an interface between the read channel and the read and write heads. The preamp includes a write driver portion which provides a bipolar square wave of current to the inductive write head. The head current must be of a programmable magnitude as well as being well controlled. The changing polarity of the write current waveform writes a logic "1" to the spinning magnetic disk of the hard drive. The inductive write head, in combination with the accompanying interconnection wiring and preamp, forms a complex resistive, inductive, capacitive (RLC) circuit which in turn introduces a certain amount of ringing or overshoot in the preamp output current waveform as shown in FIG. 1. In the past, this overshoot has been damped to some degree by simply shunting the write driver output with a resistor. More recently, disk drive manufacturers have required of preamp suppliers the ability to precisely control the amount of overshoot and to be able to vary the overshoot after the drive has been assembled.

Previous schemes for providing controlled damping of the write driver output current waveform has been to utilize various sized damping resistors selectively coupled across the write driver output. However, the damping resistors typically require large transistors, such as field effect transistors, (FETs) connected to the output to switch the resistors in and out of the write driver output circuit. This has resulted in unwanted parasitic capacitance on the output which limits writer speed performance and the number of damping levels practically integrated. In addition, because of the process and temperature variation associated with integrated circuit components, i.e., the resistors, the amount of damping could not be adequately controlled.

SUMMARY

Accordingly, it is an object of the present invention to provide an improvement in magnetic memory apparatus.

It is another object of the invention to provide an improvement in the control of the write current supplied to a write head of a magnetic memory.

It is still another object of the invention to provide an improvement in the control of overshoot in the write driver current waveform from a read/write head controller used in connection with hard disk drives.

It is still yet another object of the invention to provide programmable active damping of the write driver output current waveform from a read/write head controller used in connection with hard disk drives.

These and other objects of the invention are achieved by controlled damping of the write driver output current prior to the write driver output stage, thus minimizing output parasitics and configured in such a way that it becomes process and temperature insensitive. In the present invention, overshoot damping is provided by a combination of passive damping and active damping so as to provide a minimum base level of damping while additionally providing a programmable damping feature. Passive damping is provided by shunting a resistor across the write driver output terminals, while active damping is provided by sinking, i.e., subtracting, a precise amount of current, for a predetermined duration, at the beginning of each transition of a bipolar write driver output current fed to the write head of a hard disk drive.

Further scope of applicability of the present invention will become apparent from the detailed description provided hereinafter. It should be understood, however, that the detailed description and the specific example, while indicating the preferred embodiment of the invention, is provided by way of illustration only, since various changes, alterations and modifications coming within the spirit and scope of the invention will become apparent to those skilled in the art from the detailed description.

BRIEF DESCRIPTION OF THE DRAWINGS

The present invention will become more fully understood from the detailed description provided hereinbelow and the accompanying drawings which are given by way of illustration only, and thus are not meant to be limitative of the present invention, and wherein.

DETAILED DESCRIPTION OF THE INVENTION

Figure 1:
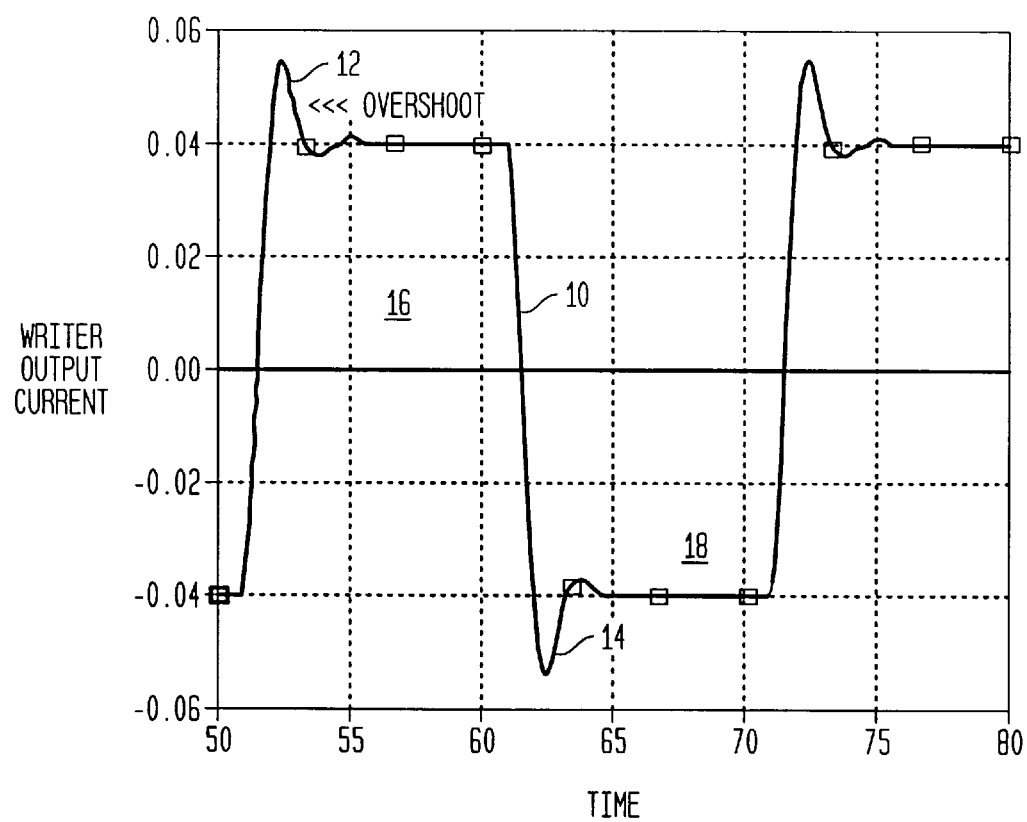
FIG. 1 is a waveform depicting overshoot in the current waveform fed to the write portion of a read/write head of a hard disk drive.

Referring now to the drawings and more particularly to FIG. 1, reference numeral 10 depicts a bipolar writer output current waveform fed to an inductive write head of a hard disk drive which includes overshoot portions 12 and 14 on the leading edges of a positive current pulse 16 and a negative current pulse 18, respectively. Whereas, the amount of overshoot has been controlled by damping resistor(s) connected across the write head, the present invention is directed to a method and apparatus for actively controlling the overshoot by a programmable control system shown in FIG. 2.

Figure 2:
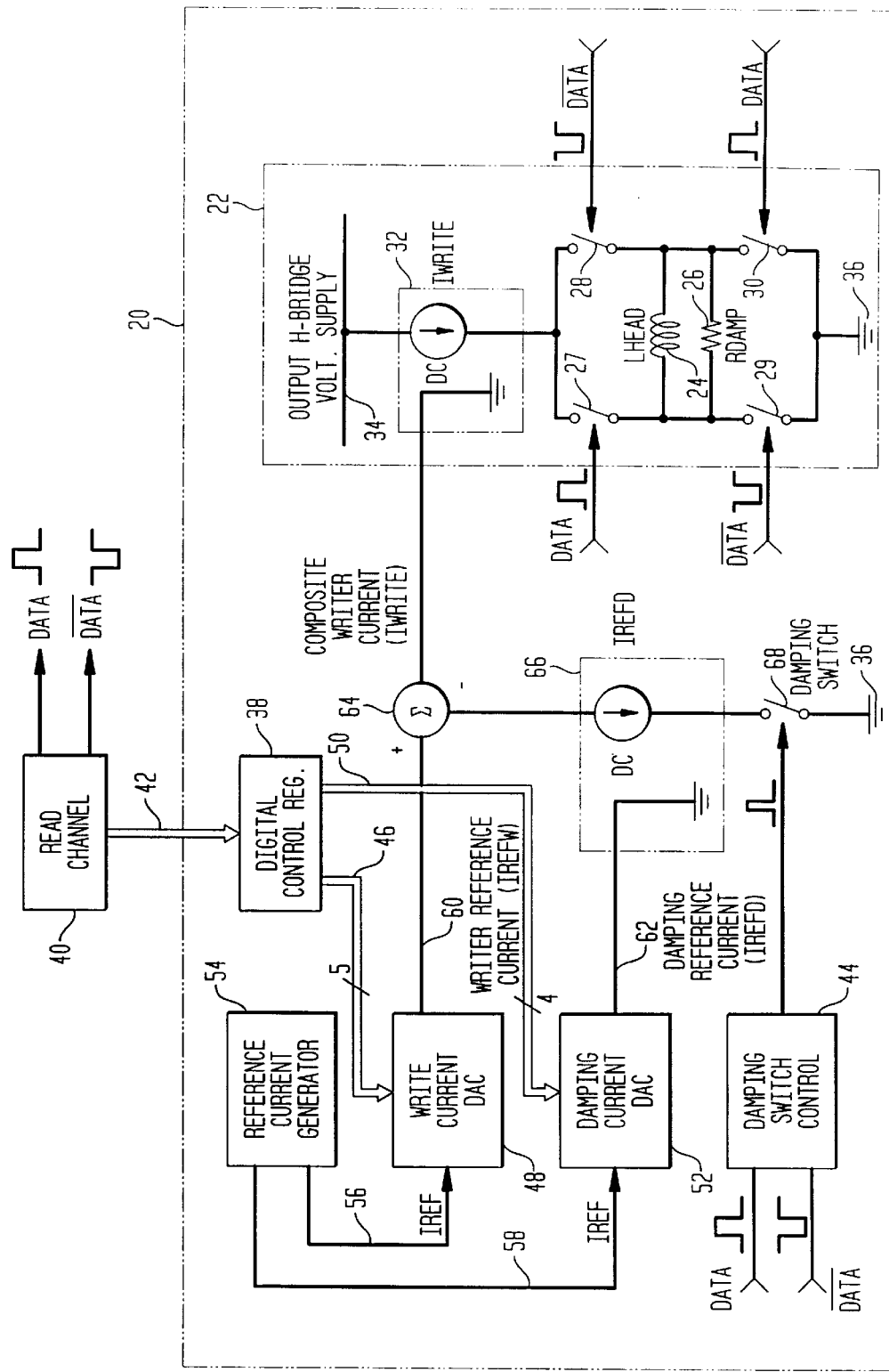
FIG. 2 is a block diagram illustrative of the preferred embodiment of the invention; and, FIG. 3 is a set of waveforms depicting the operation of the subject invention.

Referring now to FIG. 2, reference numeral 20 denotes the write driver portion of a read/write head controller or preamp, not shown, of a hard disk drive which typically comprises an integrated circuit chip including a writer circuit portion, a reader circuit portion, a serial interface portion, and a fault detection circuit portion. As shown in FIG. 2, the write driver portion 20 includes, among other things, an output H-bridge 22 which operates to switch a programmed writer current (IWRITE) bidirectionally back and forth through an inductive write head (LHEAD) 24 shunted by fixed resistor (RDAMP) 26 via four electrically controlled switch devices 27, 28, 29 and 30. The writer current IWRITE supplied to the write head 24 is provided by a current source 32 comprised of, for example, a well known semiconductor circuit known as a current mirror. As shown, the current source 32 and the electrically controlled switches 27, 28, 29, and 30 are connected between the rail 34 of a voltage supply source, not shown, and a reference potential 36 shown as ground.

Further as shown in FIG. 2, the write driver portion 20 of the preamp also includes a digital control register 38 coupled to the read channel 40 by a serial interface bus 42 which supplies digital control signals for controlling the current fed to the write head 24 via the bridge circuit 22. The write driver portion 20 also receives two other control signals, DATA and $\overline{\text{DATA}}$ from the read channel 40 for controlling the switches 27, 28, 29 and 30 of the output H bridge 22 and also a damping switch control circuit 44 which will be considered hereinafter.

The digital control register 38 provides two outputs, namely: a 5 bit digital control signal on bus 46 to a writer current digital to analog converter (DAC) 48 and a 2 bit digital control signal on bus 50 to a damping current digital to analog converter (DAC) 52.

A current reference generator 54 is also shown in FIG. 2 for supplying a reference current IREF to both the write current DAC 48 and the damping current DAC 52 via lines 56 and 58. The write current DAC 48 outputs a writer reference current IREFW on line 60 while the damping current DAC 52 outputs a damping reference current IREFD on line 62. The writer reference current IREFW is fed to one input (+) of a summing junction 64, while the damping current IREFD provided by a current source 66 which also comprises a current mirror is fed to the other input (−) of the summing junction 64. A damping switch 68 controlled by the damping switch control circuit 44 is shown connected between the current source 66 and ground.

In operation, current is made to flow back and forth through the write head 24 by the four switches 27, 28, 29 and 30 in response to the data being written. For example, in one direction the DATA control signal closes switches 27 and 30, the other two 28 and 29 remaining open, while in the other direction $\overline{\text{DATA}}$ control signal operates to close switches 28 and 29, with switches 27 and 30 remaining open. Passive damping is provided by the resistor 26.

Additionally, active damping is also provided in accordance with this invention by sinking, i.e. subtracting, a precise amount of current IREFD from the writer reference current IREFW at the summing junction 64 and generating a composite writer current IWRITE for a precise duration as controlled by the closure of the damping switch 68 in accordance with the DATA and $\overline{\text{DATA}}$ signals fed to the damping switch control circuit 44.

Figure 3:
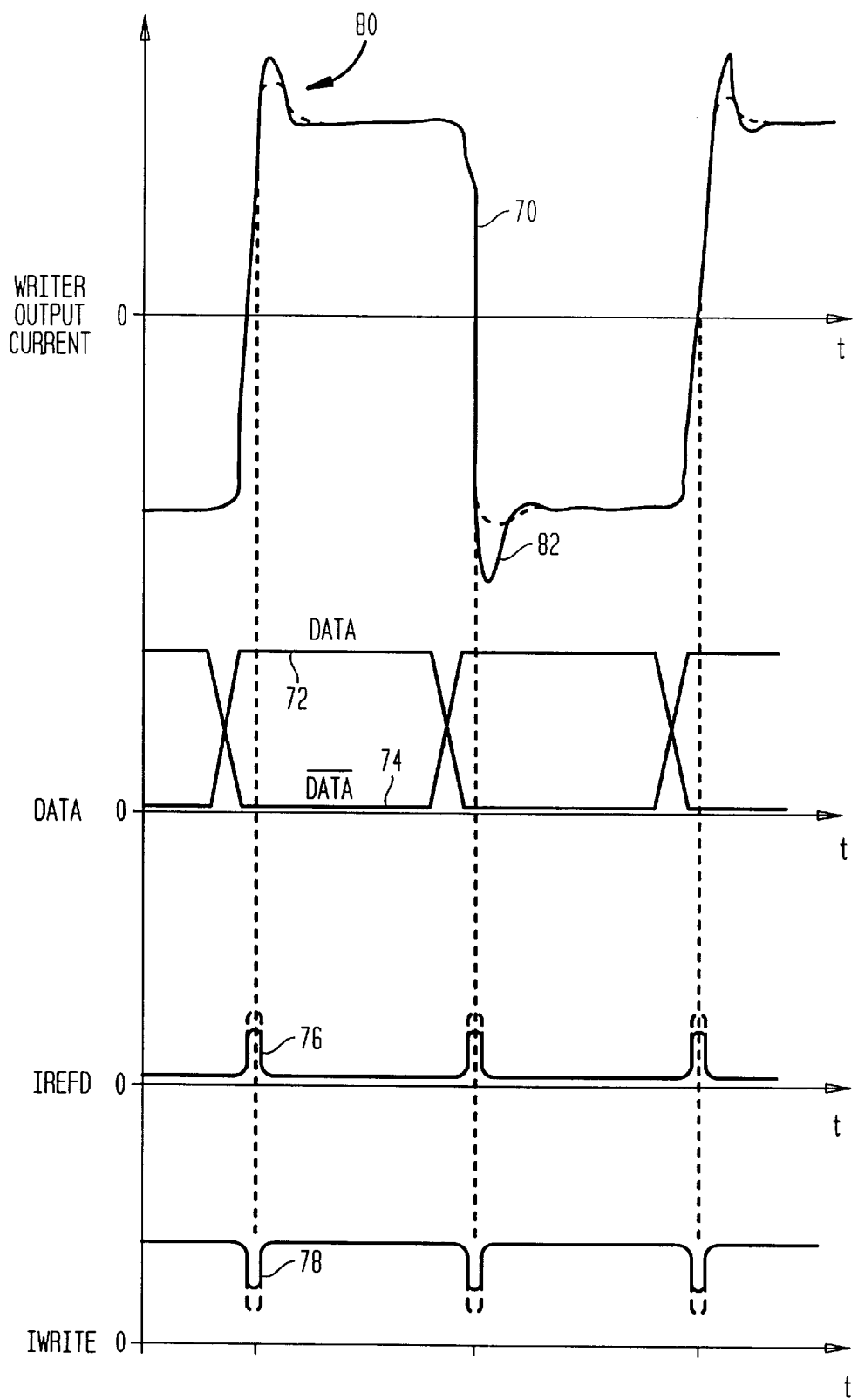

A more complete understanding will be had by a consideration of FIG. 3. Referring now to FIG. 3, shown thereat are a set of waveforms where, for example, the writer output current flowing through the writer head 24 is shown by a bipolar waveform 70. The DATA and $\overline{\text{DATA}}$ signals are shown by reference numerals 72 and 74. Reference numeral 76 represents the damping current reference current IREFD, while reference numeral 78 designates the composite writer current IWRITE resulting from the damping reference current IREFD being subtracted from the writer reference current IREFW at the summing junction 62.

The damping switch control circuit 44 generates a control pulse for operating the damping switch 68 at the beginning of every transition of the DATA and $\overline{\text{DATA}}$ signals. The amount of damping reference current IREFD subtracted from the writer reference current IREFW varies the amount of overshoot in the writer output current waveform 70 shown in FIG. 3. Thus the solid and dashed portions of the IREFD and IWRITE waveforms 76 and 78 determine the amount of overshoot in the writer output current as shown by the solid and dashed waveform portions 80 and 82 of the waveform 70. The amount of damping of the overshoot is controlled by how much damping current IREFD is subtracted from the write current IREFW which, in turn, is controlled by the damping current DAC 52, thus providing programmability.

The reference current generator 54 which provides a reference current IREF for both the write current DAC 48 and the damping current DAC 52 is designed in such a way that the reference current IREF which feeds the damping current DAC 52 is proportional to the value of the damping resistor RDAMP 26 across write head 24. As the value of resistor 26 increases, the amount of current IREFD subtracted from IREFW also increases, and as a result, the amount of damping remains constant. In this way, sensitivity to manufacturing and temperature variation in the damping control circuitry is minimized.

Thus, by reducing the writer current IWRITE briefly during output current transition by subtracting a damping reference current IREFD therefrom, the rise time of the output current 70 supplied to the write head 24, as shown in FIG. 3 is slowed down, thus reducing the overshoot in a controlled manner.

Having thus shown and described what is at present considered to be the preferred embodiment of the invention, it should be noted that the same has been made by way of illustration and not limitation. Accordingly, all modifications and alterations coming within the scope of the invention as set forth in the appended claims are herein meant to be included.

What is claimed is:

1. A method of actively damping the overshoot in a bipolar writer output current in a write head of a hard disk drive, comprising the steps of:

(a) generating a writer reference current IREFW;

(b) generating a damping reference current IREFD of a predetermined variable magnitude, said magnitude being a function of the amount of overshoot desired in the writer output current;

(c) subtracting the damping reference current IREFD from the writer reference current IREFW and generating a composite writer current IWRITE thereby; and (d) coupling the composite writer current IWRITE to the write head via a switched circuit arrangement to produce a bipolar current in the writehead.

2. A method according to claim 1 wherein the damping reference current IREFD comprises a current of variable magnitude.

3. A method according to claim 2 wherein the step of subtracting comprises subtracting the damping reference current IREFD from the writer reference current IREFW for a predetermined time at the beginning of each transition of the bipolar current.

4. A method according to claim 3 wherein the step (d) of coupling the composite writer current to the write head comprises coupling the composite writer current to a switched bridge circuit including the write head.

5. A method according to claim 4 wherein the bridge circuit operates to switch the composite writer current bidirectionally through the write head.

6. Apparatus included in an integrated circuit for providing active and passive damping of the overshoot in the writer output current flowing in a magnetic write head of a magnetic memory, comprising:

a first electrical circuit for providing a bidirectional flow of writer output current through the write head in response to a writer current applied thereto;

an electrical impedance of a predetermined value shunted across the write head for providing passive damping of the overshoot in the writer output current;

a first current source generating a writer reference current of a predetermined magnitude;

a second current source generating a damping reference current having a variable magnitude corresponding to the amount of damping desired; and, a second electrical circuit for subtracting the magnitude of the damping reference current from the magnitude of the writer reference current so as to generate a composite writer current which is fed to the first electrical current and thereby providing active damping of the overshoot.

7. Apparatus according to claim 6 wherein the magnetic memory comprises a hard disk drive.

8. Apparatus according to claim 6 wherein the electrical impedance comprises a resistor.

9. Apparatus according to claim 6 and additionally including a third electrical circuit for applying the damping reference current to the second electrical circuit for a predetermined time at the beginning of each transition of the writer output current from one current direction to the other and thereby provide active damping of the overshoot in the write output current.

10. Apparatus according to claim 9 wherein the first electrical circuit includes a switched bridge circuit.

11. Apparatus according to claim 10 wherein the switched bridge circuit includes four circuit arms connected between first and second pairs of bridge terminals and having respective electrically controlled switches in each circuit leg, wherein the write head is coupled across one pair of terminals of said first and second pairs of terminals, and the other pair of terminals of said first and second pairs of terminals is coupled between the third electrical circuit and a reference voltage.

12. Apparatus according to claim 11 wherein the electrically controlled switches are driven by a pair of complimentary square wave signals which render the switches in opposing arms of the bridge circuit alternately conducting and non-conducting so as to produce a bidirectional or bipolar write output current.

13. Apparatus according to claim 12 wherein the first electrical circuit includes a current source connected between the switched bridge circuit and the second electrical circuit.

14. Apparatus according to claim 13 wherein the second electrical circuit includes a summing circuit junction having a first input terminal connected to the first current source, a second input terminal connected to the second current source, and an output terminal connected to the first electrical circuit.

15. Apparatus according to claim 13 wherein the switched bridge circuit and the current source form an output H-bridge for the write head.

16. Apparatus according to claim 15 wherein the current source comprises a current mirror type of circuit.

17. Apparatus according to claim 11 wherein the third electrical circuit includes a controlled switch for generating a pulse of damping reference circuit applied to the second circuit.

18. Apparatus according to claim 17 and additionally including a switch control circuit responsive to at least one data control signal for operating said controlled switch at the beginning of each current direction transition of the writer output current.

19. Apparatus according to claim 6 and additionally including a reference current generator and wherein the second current source receives a reference current input from the reference current generator for generating a damping reference current proportional to the value of the electrical impedance shunted across the write head.

20. Apparatus according to claim 19 wherein the first current source also receives a reference current input from the reference current generator for generating the writer reference current.

* * * * *